C. D. ORCUTT.
SLED.
APPLICATION FILED MAR. 31, 1911.
1,019,349.
Patented Mar. 5, 1912.
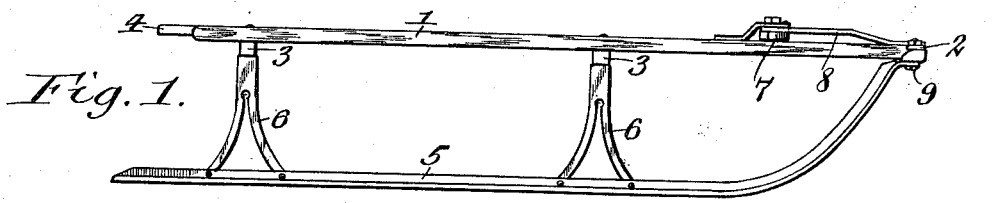
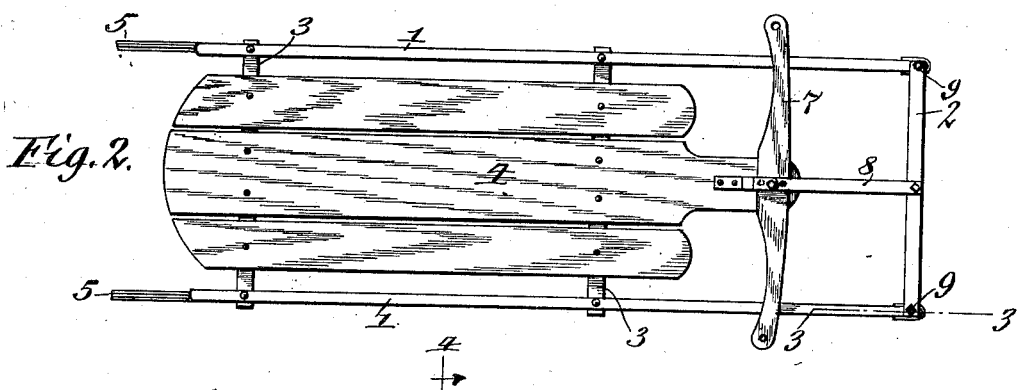
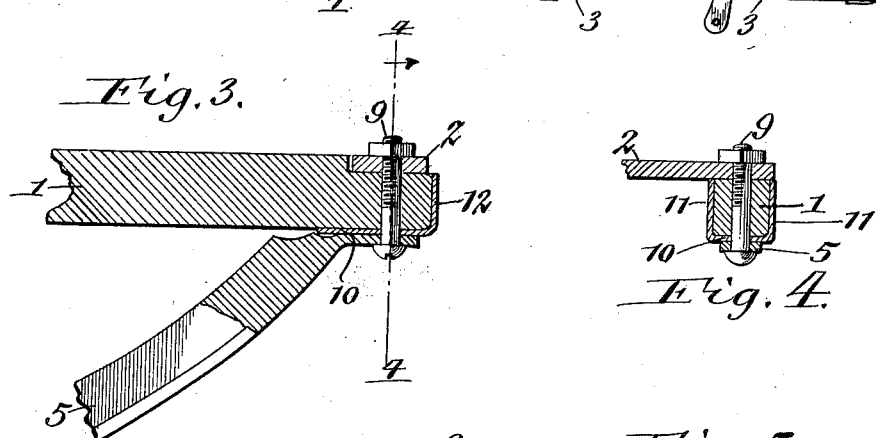
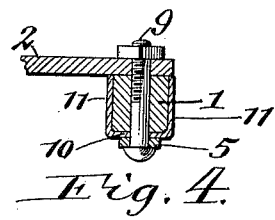
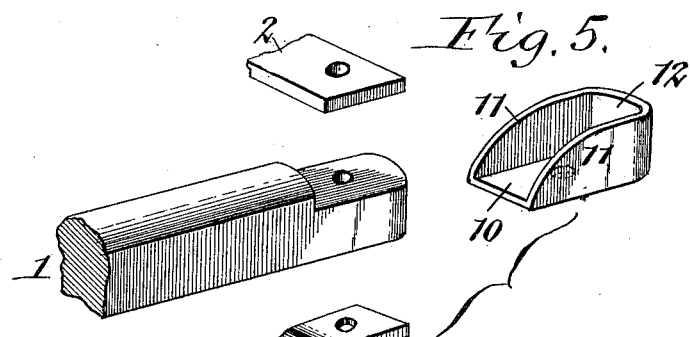
Witnesses:—
Alfred Borkenhagen.
Richard Sommer.
Inventor
Charles D. Orcutt
by Geyer & Robb
Attorneys.
COLUMBIA PLANOGRAPH CO., WASHINGTON, D. C.

UNITED STATES PATENT OFFICE.

CHARLES D. ORCUTT, OF NORTH TONAWANDA, NEW YORK, ASSIGNOR TO BUFFALO SLED COMPANY, OF BUFFALO, NEW YORK.

SLED.

1,019,349.  Specification of Letters Patent.  Patented Mar. 5, 1912.

Application filed March 31, 1911. Serial No. 618,079.

*To all whom it may concern:*

Be it known that I, CHARLES D. ORCUTT, a citizen of the United States, residing at North Tonawanda, in the county of Niagara and State of New York, have invented new and useful Improvements in Sleds, of which the following is a specification.

In the form of sleds having wooden side bars or rails which are fastened at their front ends to the front ends of the runners it sometimes happens that the side bars are split at their front ends owing to the strain to which the same are subjected at this point. This is particularly liable to occur in sleds of this type in which the side bars and runners are sprung laterally for the purpose of steering the sled.

It is the object of this invention to provide means for reinforcing the front ends of the side bars where they are connected with the runners and with the adjacent cross bar so as to reduce to a minimum the liability of splitting the side bars at these places and also to prevent the parts from becoming disconnected even though the ends of the side bars should become split and thereby retain the sleigh in serviceable condition.

In the accompanying drawings: Figure 1 is a side elevation of a steerable sled equipped with my improvements. Fig. 2 is a top plan view of the same. Fig. 3 is a vertical longitudinal section, on an enlarged scale, taken in line 3—3, Fig. 2. Fig. 4 is a fragmentary cross section on line 4—4, Fig. 3. Fig. 5 is a detached perspective view of the reinforcement and parts of the adjacent cross bar, longitudinal side bar and runner.

Similar letters of reference indicate corresponding parts throughout the several views.

In its general organization the sled shown in the drawings for illustrating the application of my invention comprises two longitudinal side bars or rails 1, 1, a transverse front or steering bar 2 resting at its opposite ends on the upper sides of the side bars at the front ends of the latter, two transverse supporting bars or bolsters 3, 3 secured to the side bars at the central and rear parts thereof, a seat 4 secured to the upper side of the bolsters or supporting bars, two runners 5, 5 arranged below the side bars and having the front ends of their upwardly turned front parts arranged below the front ends of the side bars, knees 6 connecting the runners with the supporting bars, and a transverse steering lever 7 pivoted centrally on the front part of the seat so as to turn horizontally and provided centrally with a forwardly projecting steering arm 8 which is pivotally connected with the central part of the steering bar 2. Upon swinging the steering lever this movement is transmitted to the front ends of the side bars and runners for causing the sled to change its course while the same is in use.

The front end of each side bar, front cross bar and runner are connected by a fastening which extends vertically through these parts and which may be of any suitable construction, that shown in the drawings consisting of a bolt 9 which bears with its head against the underside of the runner while its nut bears against the upper side of the front cross bar 2.

Heretofore the front end of each side bar has frequently been split vertically and lengthwise on a line with the fastening bolt owing to the fact that comparatively little stock is present at this end of the side bar and the severe strains to which the same is subjected while in use. When the side bars are thus split the efficiency of the sled is seriously impaired, if not rendered wholly useless. For the purpose of strengthening the front ends of the longitudinal side bars a reinforcement is provided which is preferably constructed in the form of a ferrule comprising a flat horizontal base 10, two upright longitudinal side walls or flanges 11, 11 arranged at opposite longitudinal edges of the base, and an upright transverse wall or flange 12 arranged at the front transverse edge of the base and connecting the front ends of the side walls. A ferrule of this construction is applied to the front end of each of the side bars so that the base thereof engages with one of the horizontal sides of the side bar and its longitudinal and transverse walls are arranged along the opposite vertical sides of the side bar and across the end thereof respectively so as to prevent the stock of the side bar adjacent to the fastening between the same and the runner and front cross bar from being split, or at least from spreading to such an extent in case it should split as would impair the connection between these parts. In the preferred application of this ferrule shown in the drawings the base thereof is interposed between the underside of the side bar and the upper side of the front end of the runner, its longitudinal walls engage with opposite vertical sides of the side bar and its front wall extends across the front end of the side bar. In order to retain the ferrule in this position the fastening bolt 9 which connects the side bar, runner and front cross bar also passes through an opening formed in the base of the ferrule, as shown in Figs. 3 and 4. When thus applied the front end of the side bar is incased on four sides by the ferrule, whereby the parts of the wood of the side bar on opposite sides of the fastening bolt are bound together and the possibility of splitting of the same is reduced to a minimum. But if under unusual strains the front end of the side bar should become split lengthwise and vertically in line with the fastening bolt the split parts would be still held against spreading by the ferrule and thus held in engagement with the fastening bolt, thereby preventing disconnection of the side bar from the runner and front cross bar and maintaining the sled in a serviceable condition. This ferrule may be constructed either of cast or sheet metal but is preferably drawn up from a single flat blank of sheet metal in a manner well known in this art, thereby enabling this improvement to be applied to the sled and materially increasing its durability at small expense. This ferrule not only strengthens the front ends of the longitudinal bars where they are liable to be split upon striking an obstruction but also improves the appearance and finish of the sled.

I claim as my invention:

A sled comprising a side bar, a ferrule applied to the end of said bar and having a lower horizontal base engaging with the lower horizontal underside of said bar, two upright longitudinal side walls projecting upwardly from opposite longitudinal edges of the base and engaging with opposite longitudinal vertical sides of said bar and a vertical transverse wall projecting upwardly from the outer transverse edge of the base and extending across the outer end of said bar, a runner having its front end arranged underneath the underside of the base of the ferrule, a cross bar arranged on top of the front end of the side bar, and a fastening bolt or member extending vertically through the base of said ferrule and through said runner, side bar and cross bar.

Witness my hand this 29th day of March, 1911.

CHARLES D. ORCUTT.

Witnesses:
THEO. L. POPP,
E. M. GRAHAM.

Copies of this patent may be obtained for five cents each, by addressing the "Commissioner of Patents, Washington, D. C."